United States Patent [19]

Macaluso

[11] Patent Number: 5,092,652
[45] Date of Patent: Mar. 3, 1992

[54] EXTENDABLE AIRLINE TURBULENCE TRAY

[76] Inventor: Raymond R. Macaluso, 1715 Aldersgate Rd., Leucadia, Calif. 92024

[21] Appl. No.: 605,690

[22] Filed: Oct. 30, 1990

[51] Int. Cl.⁵ ............................................. A47C 7/62
[52] U.S. Cl. ................................. 297/146; 108/26; 108/65; 248/311.2; 297/191; 297/163
[58] Field of Search ............... 297/146, 191, 188, 163; 108/26, 63, 65, 69, 90, 93, 143; 248/311.2

[56] References Cited

U.S. PATENT DOCUMENTS

| | | | |
|---|---|---|---|
| 2,168,210 | 8/1939 | Hawksley | 108/93 X |
| 3,606,112 | 9/1971 | Cheshier | 224/42.44 |
| 3,773,381 | 11/1973 | Brennan | 297/191 |
| 3,899,982 | 8/1975 | Fetzek | 108/25 |
| 4,079,873 | 3/1978 | De La Mora | 224/48 R |
| 4,159,071 | 6/1979 | Roca | 297/163 |
| 4,431,231 | 2/1984 | Elazari et al. | 297/163 |
| 4,726,621 | 2/1988 | Müller | 297/146 |
| 4,738,423 | 4/1988 | DiFilippo et al. | 248/311.2 |
| 4,826,058 | 5/1989 | Nakayama | 224/42.44 |

Primary Examiner—Peter R. Brown
Attorney, Agent, or Firm—Baker, Maxham, Jester & Meador

[57] ABSTRACT

A stowable seat back tray table for pivotal support on a pair of support arms pivotally attached to a seat back comprises a first tray table section having upper and lower parallel planar surfaces pivotally attached to a pair of support arms for pivoting between a generally vertical stowed position and a horizontal operative position, second generally rectangular planar panel member slideably mounted on the first member and having a planar support surface selectably positionable to a stowed position overlying the first support surface and an operative position providing an extension of the first support surface, and an extensible drink container well formed in the first panel member and having a vertically extensible container support member extending below the support surface for selectively extending the depth of the well.

11 Claims, 3 Drawing Sheets

EXTENDABLE AIRLINE TURBULENCE TRAY

BACKGROUND OF THE INVENTION

The present invention relates to stowable trays used in passenger vehicles and pertains particularly to an improved seat back tray for aircraft and the like.

Many long distance passenger vehicles having multiple rows of closely spaced seats employ a stowable tray table pivotably attached to the back of each forward seat to provide a support surface to hold articles, refreshments and the like for the passenger in the seat to the rear thereof. The tray is usually small and thin and does not have means to hold cups and glasses because of the small amount of stowing space available. In some instances, the tray is folded or hinged in the center to provide greater surface support area. Examples of this approach are shown in U.S. Pat. No. 3,773,381, entitled COMPACT TRAY TABLE, issued Nov. 20, 1973 to Brennan; and in U.S. Pat. No. 4,159,071 entitled PIVOTABLE UTILITY TABLE, issued June 26, 1979 to Roca.

Another approach to providing more support surface is to provide a second tray as shown in U.S. Pat. No. 4,726,621, entitled TABLE TO BE ATTACHED AT THE REAR OF A CHAIR BACK, issued Feb. 23, 1988 to Miller. However, this approach is complex and requires additional stowage space. Neither of these approaches can provide an adequate well for holding drinks and articles to prevent spilling and the like, particularly during turbulence. Some provide holes through the support surface which may be adequate for holding cups and the like in most circumstance.

It is also known to provide telescoping or drawer-like trays for stowage and surface extension and for providing holes for cups for drinks and the like. Examples are shown in U.S. Pat. No. 3,899,982, issued Aug. 19, 1975 to Fetzek, and in U.S. Pat. No. 4,826,058, issued May 2, 1989 to Nakayama. These, however, are under dashboard mounted and cannot be easily mounted for stowage to a seat back.

It is therefore desirable that an improved tray be available that is stowable with maximum surface support area and suitable cup or drink holding wells.

SUMMARY AND OBJECTS OF THE INVENTION

It is the primary object of the present invention to provide an improved retractable seat back tray for aircraft and the like.

In accordance with a primary aspect of the present invention, a stowable seat back tray table for pivotal support on a seat back comprises a first tray member for pivotal attachment to a pair of support arms, for pivoting between a generally vertical stowed position and a horizontal operative position, and having a first planar support surface, with an extensible drink container well having vertically extensible support means extending below said support surface for selectively extending the depth of the well, and a second tray member slideably mounted on said first member, and having a planar support surface selectably positionable to a stowed position overlying said first support surface, and an operative position providing an extension of said first support surface.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figure 1:
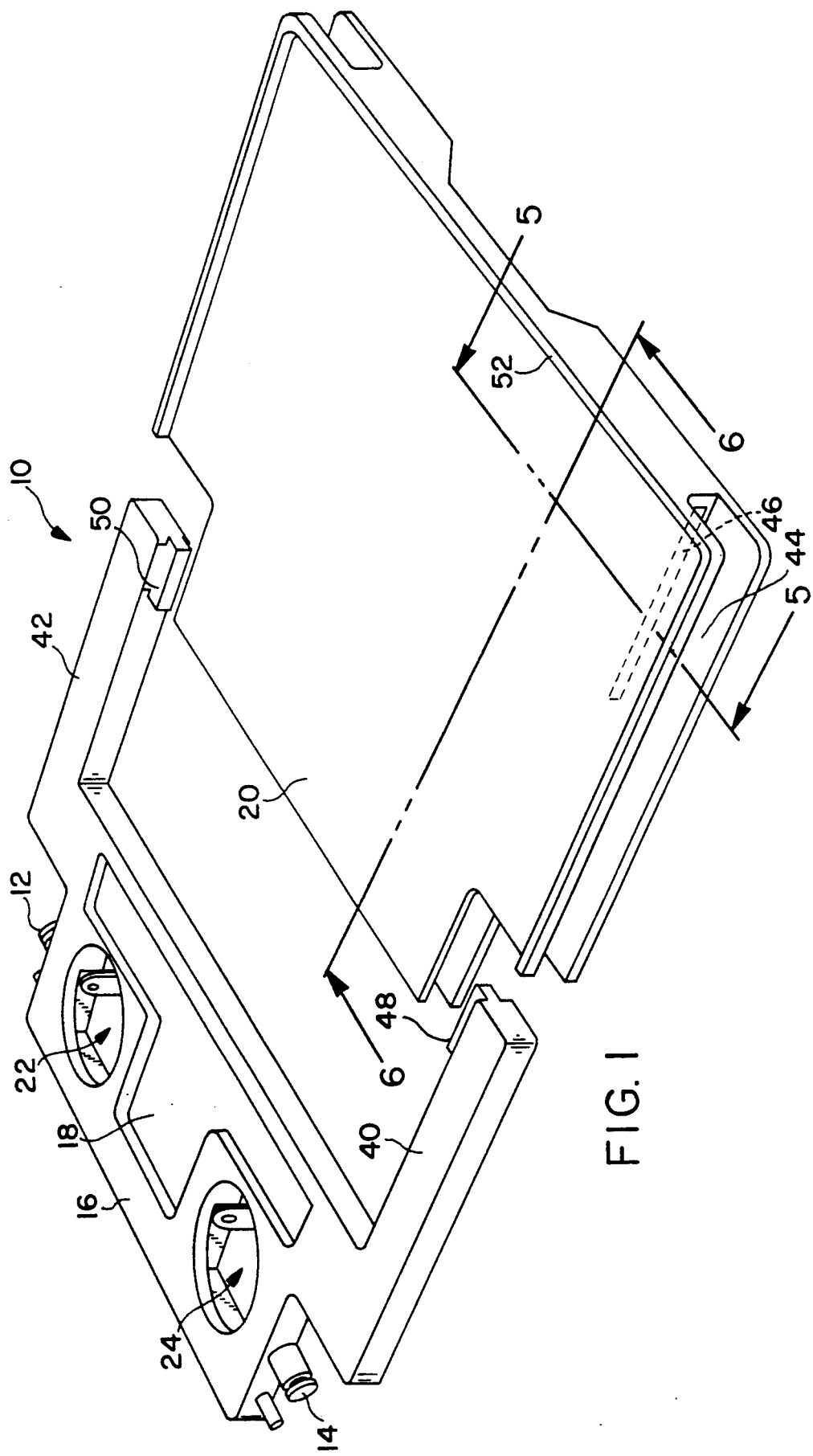
FIG. 1 is a perspective exploded view of a preferred embodiment of the invention.

Referring to the drawing, and particularly to FIG. 1, there is illustrated an extendable tray in accordance with the invention, designated generally by the numeral 10. The tray is of the general type for airline use wherein the tray is mounted on a pair of arms by a pair of hinge pins 12 and 14 at the back of a seat to serve as a support table or tray for the person in the seat behind the seat on which the tray is supported. The arms for hinge pins 12 and 14 and the connection of member 16 thereto are preferably of the type illustrated and described in U.S. Pat. Nos. 3,773,381 and 4,159,071, both of which are incorporated herein by reference as though fully set forth.

The tray comprises a first or base rectangular support tray section table or member 16 hingedly or pivotally connected to upper ends of pivoting arms by hinge pins 12 and 14, as disclosed in the aforesaid patents. The first tray table member 16 has a generally U configuration with a planar rectangular main section, with an upper planar support surface with a recess 18 for support of articles thereon. A pair of arms 40 and 42 extend outward from the base support member 16 and function as guide and support rails for a second tray or table member. A second tray or table member 20 is slideably mounted by suitable means on the arms 40 and 42 of the first table member to form a retractable extension thereof. The second tray member preferably slips or slides over the first tray table to form thereby an extension of the support surface thereof.

Figure 3:
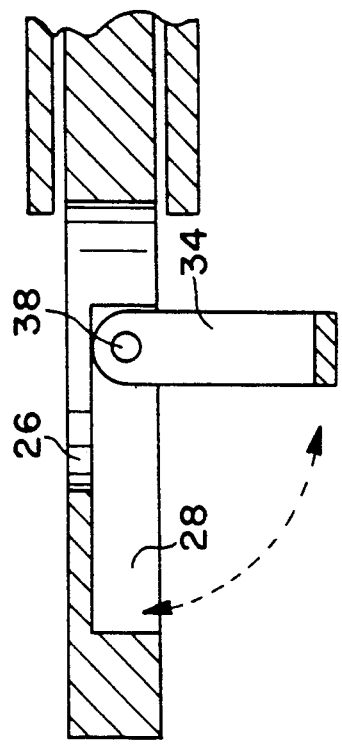
FIG. 3 is a section view taken generally on line 3—3 of FIG. 2.
Figure 2:
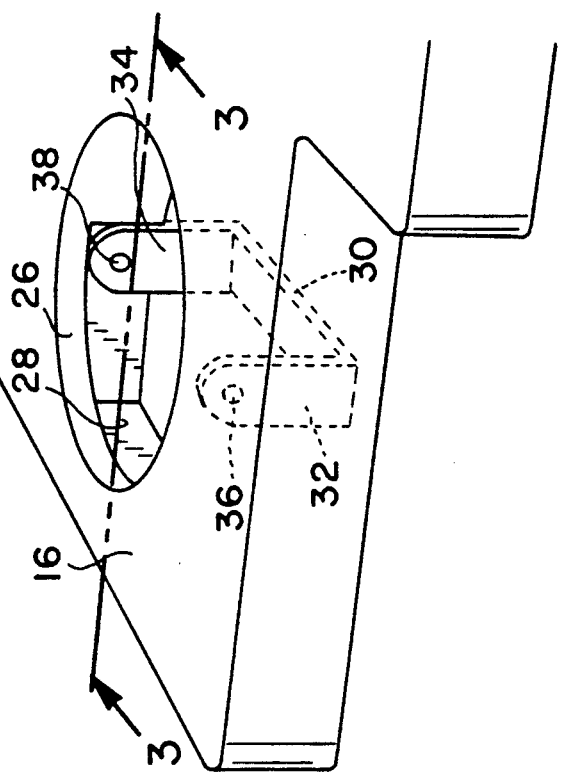
FIG. 2 is an enlarged detailed perspective view illustrating details of a cup well of the embodiment of FIG. 1.

The first tray table member 16 includes a pair of spaced apart extensible drink wells 22 and 24 with cup support means, which retractably mount within recesses therein. In the illustrated embodiment, a pivotable hanger extends downward below the bottom of the table member to provide deeper secure wells for the reception and securing of cups, glasses and the like. The wells may be identical and well 24 will be described with reference to FIGS. 1-3. The well comprises a hole or bore 26 through the table member or panel 16, with a rectangular recess 28 formed to one side into which a U-shaped hanger 30 is retracted to a stowed position. The hanger 30 includes a pair of arms 32 and 34 which extend upward and are pivotally secured at the upper ends thereof by screws or pins 36 and 38 to the sides of the recess 28. The hanger falls or pivots down by the force of gravity to the operative position when table panel 20 is pulled out. When table panel 20 is pushed inward, the forward edge thereof engages and cams hanger 30 upward into the cavity to the stowed position. An additional rectangular well 26 may also be provided for holding other articles in a secure fashion.

Figure 6:
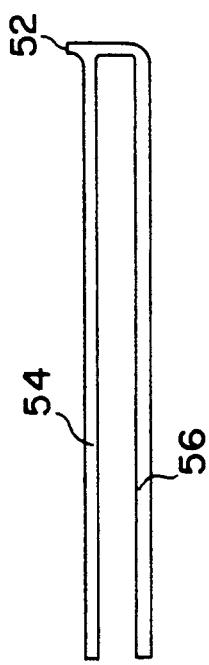
FIG. 6 is a section view taken generally on line 6—6 of FIG. 1.
Figure 5:
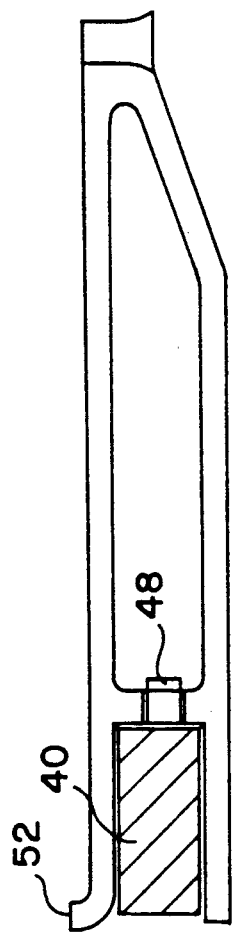
FIG. 5 is a section view taken generally on line 5—5 of FIG. 1.
Figure 4:
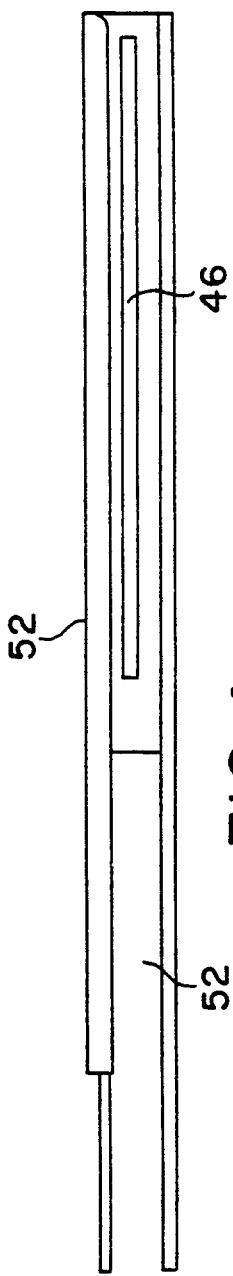
FIG. 4 is a side elevation view of the sliding tray panel.

The first table panel member 16 includes a pair of elongated outwardly extending guide and support rails 40 and 42 on which the second table panel member 20 is reciprocably mounted. The second table panel 20 includes a pair of rail engaging guide channels for engaging and supporting the panel on the guide rails 40 and 42. Only one of the guide rails or channels 44 which extends over and receives arm 40 is illustrated. This guide channel is a generally rectangular elongated channel extending along the side edge of the panel and encompasses or receives the guide rail 40, as shown in FIG. 4. The channel and additional features of the table panel 20 are also illustrated in FIGS. 4, 5 and 6.

Each channel also includes a tray extension lock groove 46, which receives a lock tab or dog 48 on arm 40 and 50 on arm 42 which cooperatively engages in the lock channel to lock or stop the tray in its outermost position to prevent it from slipping off the support arms 40 and 42. The panel 20 also includes a recess portion 52 between upper and lower panels at the forwardmost portion thereof which receives and encompasses the panel section 16. Thus, the forward section of the tray table member 20 extends completely over and covers the tray table panel 16 in the retracted or stowed position. It may also be left in this position as a forwardmost or non-extended operative position. Thus, in the illustrated embodiment, the forward or first tray table panel 16 provides the holding recesses and wells 18, 22 and 24, and the rear or second panel member 20 provides the primary support surface.

In addition to this support surface, the panel 20 also includes an upturned rim 52 which extends around three sides of the table surface. The above described structural arrangement provides an improved stowable tray table, which is retractable to an operative or stowable position, with the first tray table section being retracted into the second tray table section. In addition, the entire tray table when in the retracted position may be folded up against the back of the forward seat as in the aforementioned patents.

The tray table member 20 is preferably constructed of a hollow core as illustrated to provide a high strength lightweight structure. The structure may be molded of a suitable durable lightweight plastic with spaced upper and lower sheets 54 and 56, as illustrated in FIGS. 4, 5, and 6.

The extensible wells may also be formed or constructed in any number of other ways, for example they may include a tubular sleeve slideably mounted within a tubular cylindrical recess, and having means in the form of a suitable mechanism for biasing or extending the well and for retracting the well. The mechanism for retracting and extending the well preferably includes means such as a cam carried by the second tray member, and responsive to movement thereof for retracting the respective well just as the extensible member is sliding to a position to slide over the respective well. When the tray and wells are not in use, the extensible tray slides over the retracted well and first tray and is stowable therewith into a recess on the back of the chair in front or seat in front in the conventional manner.

One such mechanism (not shown) for extending and retracting the respective wells comprises an elongated linear cam member carried by the extendable tray member and engaging follower means on the respective well sleeve for caming respectively into the extended or retracted positions. This is an alternate simplified or simple and effective mechanism for operating the wells to the optimum positions.

The extensible tray member is preferably of substantially the same but slightly greater thickness than that of the base tray member, such that the combination forms a compact stowable tray unit. Preferably, the extensible unit adds very slightly to the thickness of the overall tray assembly.

While I have illustrated and described my invention by means of specific embodiments, it is to be understood that numerous changes and modifications may be made therein without departing from the spirit and scope of the invention as defined in the appended claims.

I claim:

1. A stowable seat back tray table for pivotal support on a pair of support arms pivotally attached to a seal back, comprising:

a first tray table section defined by a first generally rectangular planar panel member having upper and lower parallel planar surfaces pivotally attached to said pair of support arms for pivoting between a generally vertical stowed position and a horizontal operative position and having a first planar support surface defined by said upper planar surface and a pair of parallel arms extending outward therefrom for slideably supporting a second member tray table section;

said second tray table section comprising a second generally rectangular planar panel member slideably mounted on said first member and having a second planar support surface selectably positionable to a stowed position overlying said first support surface and an operative position providing an extension of said first support surface, and channel means for receiving said parallel arms for slideable support thereof;

an extensible drink container well formed in said first panel member and having vertically extensible container support means extending below said upper planar support surface for selectively extending the depth of said well; and means including a forward edge of said second panel member for engaging and biasing said extensible support means to a retracted position.

2. A stowable seat back gray table according to claim 1 wherein:
   said second panel member telescopically extends over said first panel member.

3. A stowable seat back tray table according to claim 1 wherein:
   said first panel member includes a plurality of said extensible drink container wells.

4. A stowable seat back tray table according to claim 1 wherein:
   said container well comprises a hole through said first panel member;
   a hanger pivotally mounted in and extending below said hole in the operative position; and
   a recess in said first panel member into which said hanger retracts for stowing.

5. A stowable seat back tray table according to claim 1 wherein:

said second panel member comprises spaced upper and lower sheets forming a substantially hollow core.

6. A stowable seat back tray table for pivotal support on a pair of support arms pivotally attached to a seat back, comprising:
   a first generally U-shaped table section defined by a first generally rectangular planar panel member having a pair of guide and support arms extending outwardly in parallel relation and in a plane therewith, and upper and lower parallel planar surfaces, said first table section pivotally attached to a pair of support arms for pivoting between a generally vertical stowed position and a horizontal operative position and having a first planar support surface defined by said upper planar surface; and
   a second generally rectangular planar panel member slideably mounted on said support arms of said first member and having a second planar support surface selectably positionable to a stowed position overlying said first support surface and an operative position providing an extension of said first support surface; and
   extensible drink container well formed in said first panel member and comprising an aperture through said panel, and a generally U-shaped hanger pivotally supported at its ends in said aperture for pivoting to a support position under the force of gravity, and biased by a forward edge of said second support tray member to a retracted stowed position.

7. A stowable seat back tray table according to claim 6 wherein said second tray table member includes channel means for receiving said arms for slideable support thereof.

8. A stowable seat back tray table according to claim 7 wherein:
   said channel means comprises a pair of outwardly directed open ended channels extending along side edges of said second second panel member;
   an elongated slot formed in and extending along each of said slots; and
   a projecting lug on each of said arms extending into each of said slots for limiting the sliding movement of said second panel relative to said first panel.

9. A stowable seat back tray table according to claim 8 wherein:
   said second panel member comprises spaced upper and lower sheets forming a substantially hollow core.

10. A stowable seat back tray table for pivotal support on a pair of support arms pivotally attached to a seat back, comprising:
    a first generally U-shaped table section defined by a first generally rectangular planar panel member having a pair of guide and support arms extending outwardly in parallel relation and in a plane therewith, and upper and lower parallel planar surfaces, said first table section pivotally attached to a pair of support arms for pivoting between a generally vertical stowed position and a horizontal operative position and having a first planar support surface defined by said upper planar surface;
    a second generally rectangular planar panel member having channel means extending along opposed side edges thereof for receiving said arms for slideable support thereof, and having a second planar support surface selectably positionable to a stowed position overlying said first support surface and an operative position providing an extension of said first support surface; and
    a pair of extensible drink container wells formed in said first panel member, each comprising an aperture through said panel and an adjacent recess, and a generally U-shaped hanger pivotally supported at its ends in said aperture for pivoting downward to a support position under the force of gravity, and biased by a forward edge of said second support tray member to a retracted stowed position within said adjacent recess.

11. A stowable seat back tray table according to claim 10 wherein said channel means comprises a pair of outwardly directed open ended channels extending along side edges of said second second panel member;
    an elongated slot formed in and extending along each of said slots; and
    a projecting lug on each of said arms extending into each of said slots for limiting the sliding movement of said second panel relative to said first panel.

* * * * *